United States Patent
Li et al.

(10) Patent No.: US 11,147,046 B2
(45) Date of Patent: Oct. 12, 2021

(54) FORBIDDEN-RESOURCE-UNIT INDICATION FOR COEXISTING COMMUNICATION

(71) Applicant: Apple Inc., Cupertino, CA (US)

(72) Inventors: Guoqing Li, Campbell, CA (US); Yang Yu, Redwood City, CA (US); Paul V. Flynn, Menlo Park, CA (US); Yaranama Venkata Ramana Dass, Milpitas, CA (US); Vijay Kumar Ramamurthi, Milpitas, CA (US); Camille Chen, Cupertino, CA (US); Rajneesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/542,358

(22) Filed: Aug. 16, 2019

(65) Prior Publication Data

US 2020/0288437 A1    Sep. 10, 2020

Related U.S. Application Data (60) Provisional application No. 62/814,174, filed on Mar. 5, 2019.

(51) Int. Cl.
*H04W 72/04* (2009.01)
(52) U.S. Cl.
CPC .................................. *H04W 72/04* (2013.01)
(58) Field of Classification Search
CPC ... H04W 72/04; H04W 4/00; H04W 73/0453; H04B 7/0617; H04B 7/0619; H04B 7/0413; H04B 7/0417; H04B 7/0626; H04B 7/0634; H04B 7/0643; H04B 7/06; H04L 1/1614; H04L 1/1664; H04L 5/00; H04L 5/0057; H04L 5/006; H04L 5/0023; H04L 27/2613
USPC ........................................................ 370/329
See application file for complete search history.

(56) References Cited

U.S. PATENT DOCUMENTS

| | | | | |
|---|---|---|---|---|
| 10,123,331 | B2* | 11/2018 | Park ...................... | H04L 5/0094 |
| 10,341,962 | B2* | 7/2019 | Petersson .............. | H04W 72/08 |
| 10,375,683 | B2* | 8/2019 | Verma .................. | H04W 52/146 |
| 10,383,092 | B2* | 8/2019 | Vermani .............. | H04B 7/0626 |
| 10,505,595 | B2* | 12/2019 | Hedayat ................ | H04B 7/063 |
| 10,523,361 | B2* | 12/2019 | Chun ................... | H04L 27/2602 |
| 10,680,683 | B2* | 6/2020 | Yun ....................... | H04B 7/0658 |
| 10,772,099 | B2* | 9/2020 | Verma .................. | H04L 5/0094 |
| 2017/0054542 | A1* | 2/2017 | Vermani .............. | H04B 7/0643 |
| 2018/0027571 | A1* | 1/2018 | Shi ....................... | H04W 72/048 |
| | | | | 370/329 |
| 2018/0139635 | A1 | 5/2018 | Oteri | |
| 2018/0176918 | A1 | 6/2018 | Hedayat | |

(Continued)

*Primary Examiner* — Man U Phan
(74) *Attorney, Agent, or Firm* — Kowert, Hood, Munyon, Rankin & Goetzel, P.C.

(57) ABSTRACT

An interface circuit in an electronic device (such as an access point) may request a channel status in order to specify a subset of one or more frequency sub-bands. During operation, the interface circuit may provide at least a frame to the recipient electronic device, where the frame requests the channel status for the one or more frequency sub-bands. Then, the electronic device may receive one or more measurement results from the recipient electronic device that specify the subset of the one or more frequency sub-bands (such as one or more RUs) that are not to be used when communicating with the recipient electronic device.

20 Claims, 6 Drawing Sheets

(56) References Cited

U.S. PATENT DOCUMENTS

2018/0343658 A1* 11/2018 Alsusa ............... H04W 72/082
2019/0261369 A1    8/2019 Verma
2020/0266908 A1*  8/2020 Qian .................. H04L 27/2613

* cited by examiner

FORBIDDEN-RESOURCE-UNIT INDICATION FOR COEXISTING COMMUNICATION

CROSS-REFERENCE TO RELATED APPLICATION

This application claims the benefit of U.S. Provisional Application No. 62/814,174, entitled "Forbidden-Resource-Unit Indication for Coexisting Communication," by Guoqing Li, et al., filed Mar. 5, 2019, the contents of which are hereby incorporated by reference.

FIELD

The described embodiments relate, generally, to wireless communications among electronic devices, including techniques for communicating information that specifies one or more forbidden resource units to reduce or eliminate interference during coexisting or concurrent communication using different communication protocols.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). IEEE 802.11ax has introduced an uplink (UL) orthogonal frequency division multiple access (OFDMA) technique in which different recipient electronic devices (which are sometimes referred to as 'clients' or 'stations') can transmit simultaneously in uplink. During these uplink transmissions, each of the recipient electronic devices occupies or uses a partial channel bandwidth (which is referred to as a 'resource unit' or RU). For example, there may be multiple ways RUs can be defined in an 80 MHz bandwidth. The minimum RU size is 26 tones, which is approximately 2 MHz. However, other RU sizes can be used.

Typically, UL OFDMA transmission is scheduled by an access point by sending a trigger frame that specifies the RU(s) assigned to a recipient electronic device. Then, when the recipient electronic device responds, it transmits in its specified RU(s). Otherwise, the recipient electronic device may hold transmission.

However, the recipient electronic device may have other radio activity, such as Bluetooth™ (from the Bluetooth Special Interest Group of Kirkland, Wash.). A Bluetooth radio can hop across up to 79 1-MHz wide channels. In the 2.4 GHz band of frequencies, a Bluetooth radio typically hops across a bandwidth of 20 MHz. When this occurs, the radio-frequency signal leakage from Bluetooth may interfere with Wi-Fi reception and vice versa. This is the case even if the Bluetooth operating channels only partially overlap the Wi-Fi operating channel. Consequently, Bluetooth and Wi-Fi typically do not operate at the same time. Instead, Wi-Fi and Bluetooth radios often employ timesharing, even though timesharing can be inefficient.

SUMMARY

A first group of embodiments relates to an electronic device that requests a channel status in order to specify a subset of one or more frequency sub-bands. This electronic device may include a node that can be communicatively coupled to an antenna, and an interface circuit communicatively coupled to the node and that communicates with at least a recipient electronic device. During operation, the interface circuit provides at least a frame to (e.g., intended for) the recipient electronic device, where the frame requests the channel status for the one or more frequency sub-bands. Then, the interface circuit receives one or more measurement results from (e.g., associated with) the recipient electronic device that specify the subset of the one or more frequency sub-bands that are not to be used when communicating with the recipient electronic device.

Note that at least the frame may be associated with a sounding procedure.

Moreover, the one or more measurement results may be included in a beamforming report. For example, the subset of the one or more frequency sub-bands may be specified in a V matrix in the beamforming report.

Furthermore, at least the frame may include a null data packet announcement (NDPA) and a null data packet (NDP).

Additionally, the one or more frequency sub-bands may include one or more RUs.

In some embodiments, the one or more measurement results may include one or more instances of a predefined value that specifies the subset of the one or more frequency sub-bands.

Moreover, the interface circuit may provide a trigger frame to at least the recipient electronic device that excludes the subset of the one or more frequency sub-bands. Furthermore, the interface circuit may, in response to the trigger frame, receive an OFDMA frame from at least the recipient electronic device that has one or more blanks in the subset of the one or more frequency sub-bands.

Additionally, the interface circuit may provide a multiple-input multiple-output (MIMO) frame or an OFDMA frame to at least the recipient electronic device that excludes the subset of the one or more frequency sub-bands.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for specifying a subset of one or more frequency sub-bands. The method includes at least some of the aforementioned operations performed by the interface circuit in the electronic device.

A second group of embodiments relates to a recipient electronic device that specifies a subset of one or more frequency sub-bands. This recipient electronic device may include a node that can be communicatively coupled to an antenna, and an interface circuit communicatively coupled to the node and that communicates with an electronic device. During operation, the interface circuit receive at least a frame from the electronic device, where the frame requests a channel status for the one or more frequency sub-bands. Then, the interface circuit provides one or more measurement results to the electronic device that specify the subset of the one or more frequency sub-bands that are not to be used when communicating with the recipient electronic device.

Note that at least the frame may be associated with a sounding procedure.

Moreover, the one or more measurement results may be included in a beamforming report. For example, the subset of the one or more frequency sub-bands may be specified in a V matrix in the beamforming report.

Furthermore, at least the frame may include an NDPA and an NDP.

Additionally, the one or more frequency sub-bands may include one or more RUs.

In some embodiments, the one or more measurement results may include one or more instances of a predefined value that specifies the subset of the one or more frequency sub-bands.

Moreover, the interface circuit may receive a trigger frame from the electronic device that excludes the subset of the one or more frequency sub-bands. Furthermore, the interface circuit may, in response to the trigger frame, provide an OFDMA frame to the electronic device that has one or more blanks in the subset of the one or more frequency sub-bands.

Additionally, the interface circuit may receive a MIMO frame or an OFDMA frame from the electronic device that excludes the subset of the one or more frequency sub-bands.

In some embodiments, the interface circuit may determine the subset of the one or more frequency sub-bands for which the recipient electronic device has a coexistence issue (e.g., problem) with a different communication protocol, e.g., a protocol other than a communication protocol used to receive at least the frame.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for specifying a subset of one or more frequency sub-bands. The method includes at least some of the aforementioned operations performed by the interface circuit in the recipient electronic device.

A third group of embodiments relates to an electronic device that receives a management frame. This electronic device may include a node that can be communicatively coupled to an antenna, and an interface circuit communicatively coupled to the node and that communicates with at least a recipient electronic device. During operation, the interface circuit receives the management frame from the recipient electronic device that specifies a subset of one or more frequency sub-bands that are not to be used when communicating with the recipient electronic device.

Note that at least the management frame may include an information element that specifies the subset of one or more frequency sub-bands. For example, the information element may include a bitmap that specifies the subset of one or more frequency sub-bands. In some embodiments, the bitmap may include one or more instances of a predefined value that specifies the subset of one or more frequency sub-band.

Moreover, the one or more frequency sub-bands may include one or more RUs.

Furthermore, the interface circuit may provide a trigger frame to at least the recipient electronic device that excludes the subset of one or more frequency sub-bands. Additionally, the interface circuit may, in response to the trigger frame, receive an OFDMA frame from at least the recipient electronic device that has blanks in the subset of one or more frequency sub-bands.

In some embodiments, the interface circuit may provide a MIMO frame or an OFDMA frame to at least the recipient electronic device that excludes the subset of one or more frequency sub-bands.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for providing a trigger frame. The method includes at least some of the aforementioned operations performed by the interface circuit in the electronic device.

A fourth group of embodiments relates to a recipient electronic device that provides a management frame. This recipient electronic device may include a node that can be communicatively coupled to an antenna, and an interface circuit communicatively coupled to the node and that communicates with an electronic device. During operation, the interface circuit provides the management frame to the electronic device that specifies a subset of one or more frequency sub-bands that are not to be used when communicating with the recipient electronic device.

Note that at least the management frame may include an information element that specifies the subset of one or more frequency sub-bands. For example, the information element may include a bitmap that specifies the subset of one or more frequency sub-bands. In some embodiments, the bitmap may include one or more instances of a predefined value that specifies the subset of one or more frequency sub-band.

Moreover, the one or more frequency sub-bands may include one or more RUs.

Furthermore, the interface circuit may receive a trigger frame from the electronic device that excludes the subset of one or more frequency sub-bands. Additionally, the interface circuit may, in response to the trigger frame, provide an OFDMA frame to the electronic device that has blanks in the subset of one or more frequency sub-bands.

In some embodiments, the interface circuit may receive a MIMO frame or an OFDMA frame from the electronic device that excludes the subset of one or more frequency sub-bands.

Note that the interface circuit may determine the subset of one or more frequency sub-bands for which the recipient electronic device has a coexistence issue (e.g., problem) with a different communication protocol, e.g., a protocol other than a communication protocol used to receive at least the frame.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Other embodiments provide a method for receiving a trigger frame. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

An interface circuit in an electronic device may request a channel status in order to specify a subset of one or more frequency sub-bands. During operation, the interface circuit may provide at least a frame to the recipient electronic device, where the frame requests the channel status for the one or more frequency sub-bands. Then, the interface circuit may receive one or more measurement results from the recipient electronic device that specify the subset of the one or more frequency sub-bands (such as one or more RUs) that are not to be used when communicating with the recipient electronic device. Moreover, the interface circuit may provide a trigger frame to at least the recipient electronic device that excludes the subset of the one or more frequency sub-bands and, in response to the trigger frame, the interface circuit may receive an OFDMA frame from at least the recipient electronic device that has one or more blanks in the subset of the one or more frequency sub-bands. Alternatively or additionally, the interface circuit may provide a MIMO frame or an OFDMA frame to at least the recipient electronic device that excludes the subset of the one or more frequency sub-bands.

By specifying the subset of the one or more frequency sub-bands these communication techniques may facilitate improved communication performance between the electronic device and the recipient electronic device. For example, the communication techniques may allow one or more other portions of the one or more frequency sub-bands to be used when the recipient electronic device has a coexistence issue in the subset of the one or more frequency sub-bands with a different communication protocol (such as Bluetooth) than the communication protocol used to receive at least the frame. Consequently, the communication techniques may increase throughput and may reduce latency during communication between the electronic device and the recipient electronic device. Therefore, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Figure 1:
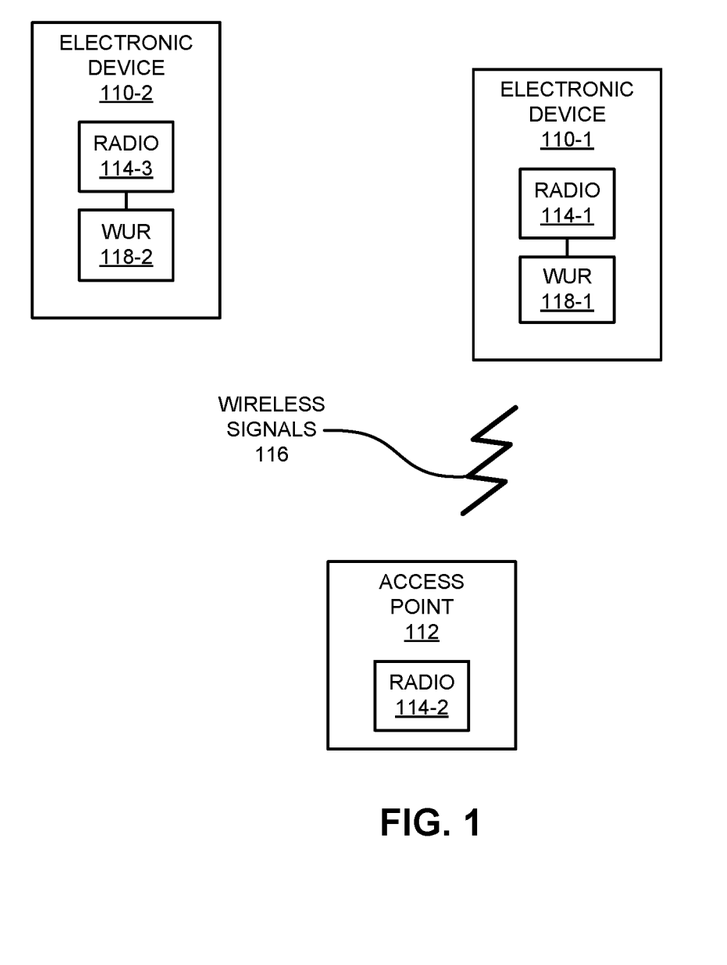
FIG. 1 is a block diagram illustrating an example of electronic devices communicating wirelessly.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-7, radio 114-1 may receive wireless signals 116 that are transmitted by radio 114-2. Alternatively, radio 114-1 may transmit wireless signals 116 that are received by radio 114-2.

Note that radio 114-1 may consume additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, when there is coexistent or concurrent (e.g., at least partially overlapping in time) communication using Bluetooth and Wi-Fi, radio-frequency signal leakage from Bluetooth may interfere with Wi-Fi reception and vice versa. Consequently, Bluetooth and Wi-Fi typically do not operate at the same time. This is the case even if the Bluetooth operating channels only partially overlap the Wi-Fi operating channel.

However, the radio-frequency signal leakage may not interfere with the entire Wi-Fi operating channel. In some cases, if a Wi-Fi radio is using a partial bandwidth transmission or reception, it can be exempted from interference from Bluetooth and vice versa. In practice, UL OFDMA may be well suited for applying this approach.

Nonetheless, in current proposals, e.g., for IEEE 802.11ax, there is no protocol or mechanism that allows a client to inform an access point of the RUs that are experiencing interference from Bluetooth or any other radio. Consequently, this deficiency can degrade the communication performance.

In order to address this challenge, as described below with reference to FIGS. 2-4, in some embodiments of the disclosed communication techniques a sounding procedure may be used to simulate or otherwise indicate a bad channel condition for certain RUs, so an access point (such as access point 112) cannot allocate these RUs to the client (such as electronic device 110-1). In the sounding procedure, access point 112 may solicit channel status from electronic device 110-1 (and, more generally, one or more recipient electronic devices) via a beamforming report. For example, access point 112 may initiate the sounding procedure by sending an NDPA packet or frame followed by an NDP packet or frame that can be used by electronic device 110-1 to measure channel quality.

In response, electronic device 110-1 may send one or more measurement results (such as a measured metric corresponding to a signal-to-noise ratio in a particular RU) in a beamforming report to access point 112, such as the V matrix or matrices. In the embodiments of the communication techniques, electronic device 110-1 may use a special value (or a particular value, a predetermined value, etc.) in the beamforming report for the one or more RUs for which electronic device 110-1 has coexistence issues, e.g., interference associated with coexisting communication using different communication protocols, such as Bluetooth. (Alternatively, in some embodiments, electronic device 110-1 may use a special value in the beamforming report for the one or more RUs for which electronic device 110-1 does not have coexistence issues.)

For example, electronic device 110-1 may set the values in the V matrix to, e.g., all zeros for the one or more RUs that have coexistence issues. When the V matrix (or matrices) are set to zero in this way, access point 112 cannot (or will not) use them. Thus, access point 112 cannot allocate the corresponding one or more RUs to electronic device 110-1 in a subsequent trigger frame. Consequently, in response to the trigger frame, electronic device 110-1 may provide an OFDMA frame to access point 112 that has blanks in the one or more specified RUs. Alternatively or additionally, access point 112 cannot provide a MIMO frame or an OFDMA frame to electronic device 110-1 that includes the one or more specified RUs.

In some implementations, access point 112 specifies the one or more RUs for which it is soliciting beamforming feedback. For example, access point 112 may request that electronic device 110-1 provide feedback for a subset of RUs that do not include one or more of the RUs that have coexistence issues. Therefore, as described further below with reference to FIGS. 5-7, in some embodiments of the communication techniques electronic device 110-1 may send an RU forbidden bitmap (which is sometimes referred to as a 'bitmap') to access point 112 to explicitly indicate undesired or forbidden RUs for electronic device 110-1. This bitmap may be provided to access point 112 in response to a request for feedback for a different subset of RUs or without access point 112 sending a request for feedback to electronic device 110-1.

Figure 7:
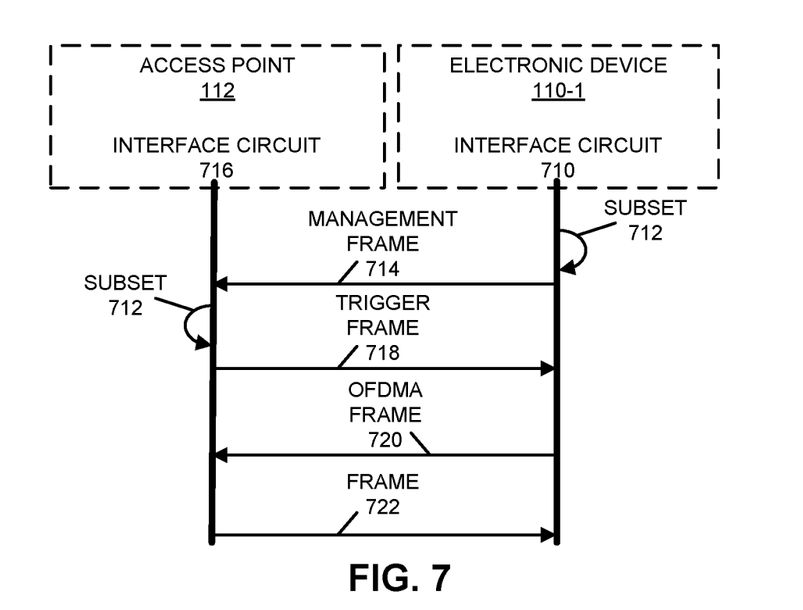
FIG. 7 is a flow diagram illustrating an example of communication between electronic devices, such as the electronic devices of FIG. 1.

Moreover, in this client-initiated approach, electronic device 110-1 may communicate a forbidden RU bitmap that contains, e.g., at least 74 bits, where each bit indicates, e.g., a possible 26-tone RU in a maximum 160 MHz channel. For example, the forbidden RU bitmap may include 10 octets in which 74 bits are used to indicate RUs and the remaining bits reserved. In some embodiments of the forbidden RU bitmap, a '1' may indicate a particular RU that is forbidden to use, and a '0' may indicate that this RU can be used.

Furthermore, as described further below with reference to FIG. 8, a new information element may be used to carry the forbidden RU bitmap. This information element can be included in a field in a new type of management frame or in an existing type of management frame that is allowed to include the new information element.

Alternatively or additionally, in addition to forbidden RU assignment for UL OFDMA transmission, access point 112 can also use the reported RUs in the forbidden RU bitmap for downlink (DL) operation. For example, based on the forbidden RU bitmap, access point 112 may transmit a DL multi-user (MU) physical layer convergence procedure (PLCP) protocol data unit (PPDU) with preamble puncturing on the specific RUs that are forbidden. This DL MU PPDU may be communicated from access point 112 to electronic device 110-1 using OFDMA or MIMO. Note that preamble puncturing, in which there are gaps or blanked out portions of the spectrum, is a special mode of DL transmission.

Thus, in some embodiments of the communication techniques, a specific value may be set in a beamforming report during a sounding procedure to eliminate the use of one or more specific RUs that have or may experience coexistence issues. Alternatively or additionally, in some embodiments of the communication techniques, an explicit RU forbidden bitmap may be defined that can be sent from electronic device 110-1 to access point 112 to indicate to access point 112 one or more undesired or forbidden RUs. This forbidden RU bitmap can be used by access point 112 to avoid allocating the one or more RUs in trigger frames to client(s) (such as electronic device 110-1) that have coexistence issues. The forbidden RU bitmap can also be used by access point 112 to avoid transmitting on the one or more specified RUs to the client(s). In one example, the forbidden RU bitmap granularity may be, e.g., a 26-tone RU. However, other values providing other granularity may be used. Furthermore, note that electronic device 110-1 may report the forbidden RU bitmap using a new information element in an existing type of management frame or may use a new type of management frame.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use MU transmission (OFDMA). For example, radio 114-2 may provide a trigger frame for the one or more electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments one or more of electronic devices 110 may individually provide acknowledgments to radio 114-2. Thus, radio 114-1 (and, more generally, radios 114 in the electronic devices 110-1 and/or 110-2) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
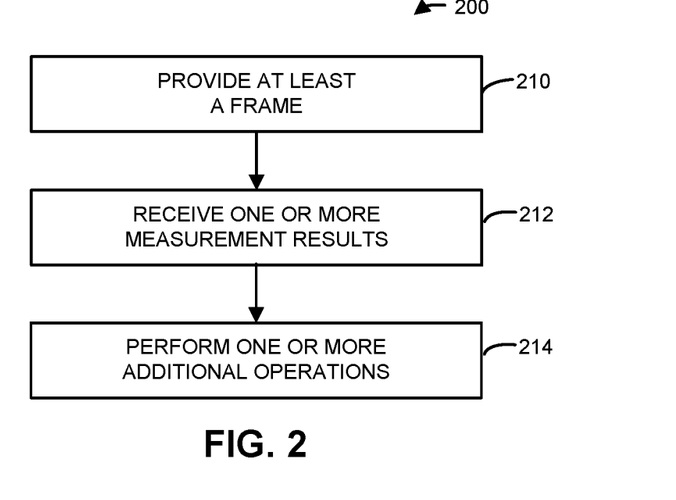
FIG. 2 is a flow diagram illustrating an example method for requesting a channel status in order to specify a subset of one or more frequency sub-bands using one of the electronic devices in FIG. 1.

FIG. 2 presents a flow diagram illustrating an example method 200 for requesting a channel status in order to specify a subset of one or more frequency sub-bands. This method may be performed by an electronic device, such as access point 112 in FIG. 1. Note that the communication with the recipient electronic device may be compatible with an IEEE 802.11 communication protocol.

During operation, the electronic device may provide at least a frame (operation 210) to the recipient electronic device, where the frame requests the channel status for the one or more frequency sub-bands. Note that at least the frame may be associated with a sounding procedure. For example, at least the frame may include an NDPA and an NDP.

Then, the recipient electronic device may receive one or more measurement results (operation 212) from the recipient electronic device that specify the subset of the one or more frequency sub-bands that are not to be used when communicating with the recipient electronic device. Note that the one or more measurement results may be included in a beamforming report. For example, the subset of the one or more frequency sub-bands may be specified in a V matrix in the beamforming report. Moreover, the one or more frequency sub-bands may include one or more RUs.

In some embodiments, the one or more measurement results may include one or more instances of a predefined value that specifies the subset of the one or more frequency sub-bands.

In some embodiments, the electronic device may optionally perform one or more additional operations (operation 214). For example, the electronic device may provide a trigger frame to at least the recipient electronic device that excludes the subset of the one or more frequency sub-bands. In response to the trigger frame, the electronic device may receive an OFDMA frame from at least the recipient electronic device that has one or more blanks in the subset of the one or more frequency sub-bands.

Alternatively or additionally, the electronic device may provide a MIMO frame or an OFDMA frame to at least the recipient electronic device that excludes the subset of the one or more frequency sub-bands.

Figure 3:
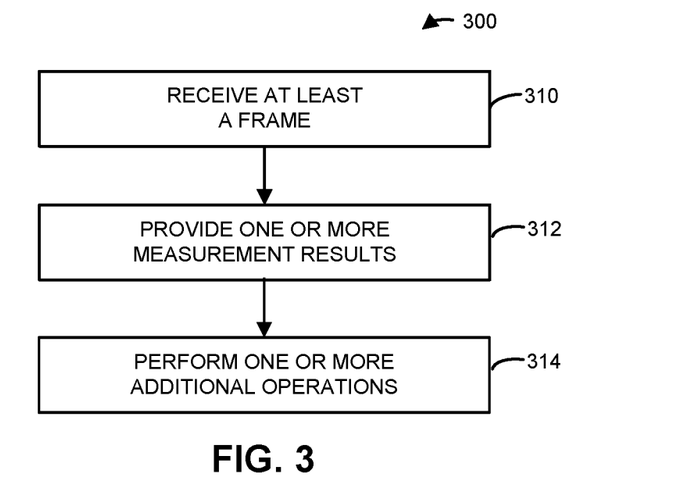
FIG. 3 is a flow diagram illustrating an example method for specifying a subset of one or more frequency sub-bands using one of the electronic devices in FIG. 1.

FIG. 3 presents a flow diagram illustrating an example method 300 for specifying a subset of one or more frequency sub-bands. This method may be performed by a recipient electronic device, such as electronic device 110-1 in FIG. 1.

Note that the communication with the electronic device may be compatible with an IEEE 802.11 communication protocol.

During operation, the recipient electronic device may receive at least a frame (operation 310) from the electronic device, where the frame requests a channel status for the one or more frequency sub-bands. Note that at least the frame may be associated with a sounding procedure. For example, at least the frame may include an NDPA and an NDP.

Then, the recipient electronic device may provide one or more measurement results (operation 312) to the electronic device that specify the subset of the one or more frequency sub-bands that are not to be used when communicating with the recipient electronic device. Note that the one or more measurement results may be included in a beamforming report. For example, the subset of the one or more frequency sub-bands may be specified in a V matrix in the beamforming report. Moreover, the one or more frequency sub-bands may include one or more RUs.

In some embodiments, the one or more measurement results may include one or more instances of a predefined value that specifies the subset of the one or more frequency sub-bands.

In some embodiments, the recipient electronic device may optionally perform one or more additional operations (operation 314). For example, the recipient electronic device may receive a trigger frame from the electronic device that excludes the subset of the one or more frequency sub-bands. In response to the trigger frame, the recipient electronic device may provide an OFDMA frame to the electronic device that has one or more blanks in the subset of the one or more frequency sub-bands.

Alternatively or additionally, the recipient electronic device may receive a MIMO frame or an OFDMA frame from the electronic device that excludes the subset of the one or more frequency sub-bands.

Figure 4:
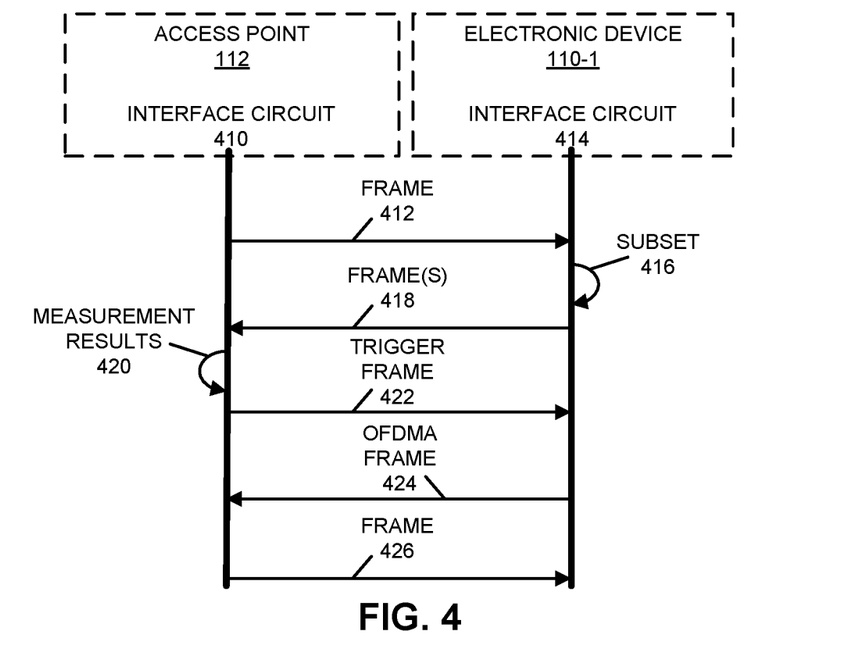
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. An interface circuit 410 in access point 112 may provide at least a frame 412 to electronic device 110-1. This frame may request the channel status for the one or more frequency sub-bands. For example, frame 412 may specify or correspond to one or more RUs.

After receiving frame 412, interface circuit 414 in electronic device 110-1 may use information conveyed when communicating frame 412 to perform one or more measurements and to determine a subset 416 of the one or more frequency sub-bands for which electronic device 110-1 has a coexistence issue, e.g., with a different communication protocol than the communication protocol used to receive at least frame 412. Then, interface circuit 414 may provide one or more packets or frames 418 to access point 112 with information that specifies measurement results 420, such as a beamforming report that specifies subset 416.

After receiving the one or more packets or frames 418, interface circuit 410 may extract measurement results 420. Subsequently, interface circuit 410 may avoid using or allocating subset 416 when communicating with electronic device 110-1.

For example, interface circuit 410 may provide a trigger frame 422 to at least electronic device 110-1 that excludes subset 416 of the one or more frequency sub-bands. In response to trigger frame 422, interface circuit 414 may provide an OFDMA frame 424 to access point 112 that has blanks in subset 416 corresponding to the one or more frequency sub-bands. Next, interface circuit 410 may receive OFDMA frame 424.

Alternatively or additionally, interface circuit 410 may provide a frame 426 (such as a MIMO frame or an OFDMA frame) to at least electronic device 110-1 that excludes subset 416 of the one or more frequency sub-bands. Then, interface circuit 414 may receive frame 426.

Figure 5:
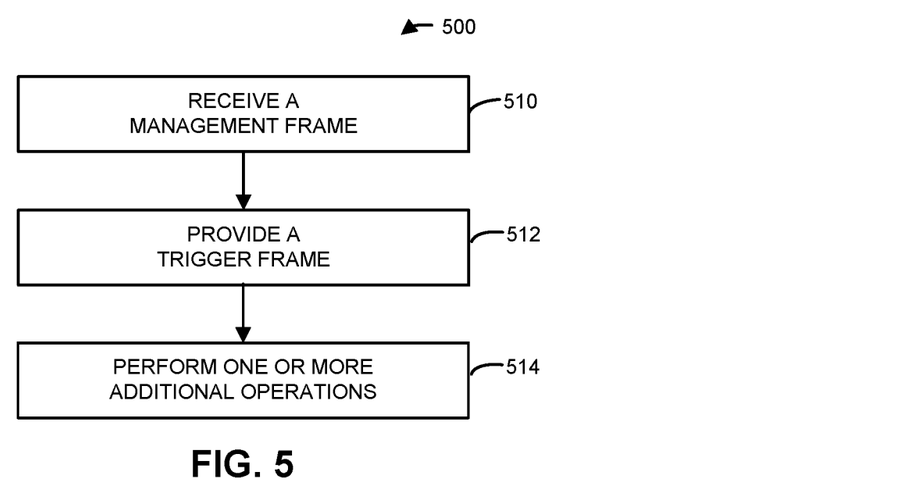
FIG. 5 is a flow diagram illustrating an example method for providing a trigger frame using one of the electronic devices in FIG. 1.

FIG. 5 presents a flow diagram illustrating an example method 500 for providing a trigger frame. This method may be performed by an electronic device, such as access point 112 in FIG. 1. Note that the communication with the recipient electronic device may be compatible with an IEEE 802.11 communication protocol.

During operation, the electronic device may receive a management frame (operation 510) from the recipient electronic device that specifies a subset of one or more frequency sub-bands that are not to be used when communicating with the recipient electronic device. Note that at least the management frame may include an information element that specifies the subset of one or more frequency sub-bands. For example, the information element may include a bitmap that specifies the subset of one or more frequency sub-bands. In some embodiments, the bitmap may include one or more instances of a predefined value that specifies the subset of one or more frequency sub-bands. Moreover, the one or more frequency sub-bands may include one or more RUs.

Then, the electronic device may provide the trigger frame (operation 512) to at least the recipient electronic device that excludes the subset of one or more frequency sub-bands.

In some embodiments, the electronic device may optionally perform one or more additional operations (operation 514). Notably, in response to the trigger frame, the electronic device may receive an OFDMA frame from at least the recipient electronic device that has one or more blanks in the subset of one or more frequency sub-bands. Alternatively or additionally, the electronic device may provide a MIMO frame or an OFDMA frame to at least the recipient electronic device that excludes the subset of one or more frequency sub-bands.

Figure 6:
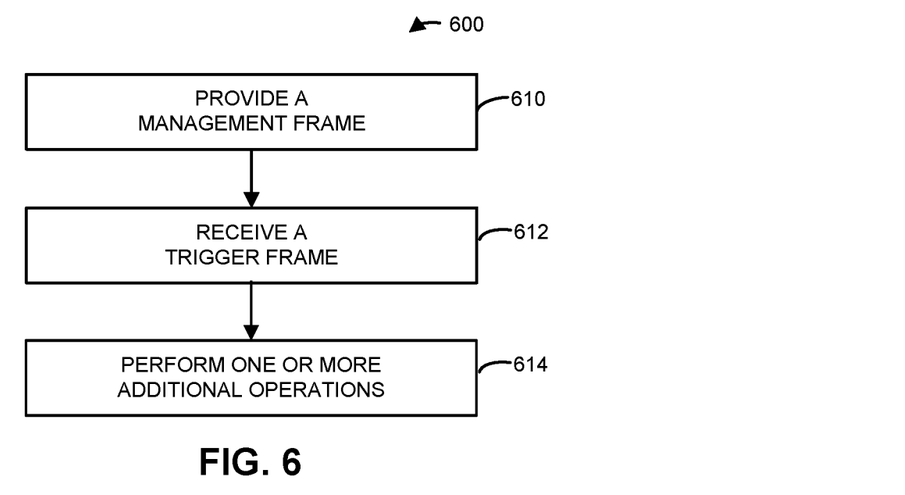
FIG. 6 is a flow diagram illustrating an example method for receiving a trigger frame using one of the electronic devices in FIG. 1.

FIG. 6 presents a flow diagram illustrating an example method 600 for receiving a trigger frame. This method may be performed by a recipient electronic device, such as electronic device 110-1 in FIG. 1. Note that the communication with the electronic device may be compatible with an IEEE 802.11 communication protocol.

During operation, the recipient electronic device may provide a management frame (operation 610) to the electronic device that specifies a subset of one or more frequency sub-bands that are not to be used when communicating with the recipient electronic device. Note that at least the management frame may include an information element that specifies the subset of one or more frequency sub-bands. For example, the information element may include a bitmap that specifies the subset of one or more frequency sub-bands. In some embodiments, the bitmap may include one or more instances of a predefined value that specifies the subset of one or more frequency sub-band. Moreover, the one or more frequency sub-bands may include one or more RUs.

Then, the recipient electronic device may receive the trigger frame (operation 612) from the electronic device that excludes the subset of one or more frequency sub-bands.

In some embodiments, the recipient electronic device may optionally perform one or more additional operations (operation 614). For example, in response to the trigger frame, the recipient electronic device may provide an OFDMA frame to the electronic device that has blanks in the subset of one or more frequency sub-bands. Alternatively or additionally, the recipient electronic device may receive a MIMO frame or an OFDMA frame from the electronic device that excludes the subset of one or more frequency sub-bands.

Note that the recipient electronic device may determine the subset of one or more frequency sub-bands for which the recipient electronic device has a coexistence issue with a different communication protocol than the communication protocol used to receive at least the frame.

In some embodiments of methods 200 (FIG. 2), 300 (FIG. 3), 500 (FIG. 5) and/or 600 (FIG. 6), there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2), 300 (FIG. 3), 500 (FIG. 5) and/or 600 (FIG. 6) are, at least in part, performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

The communication techniques are further illustrated in FIG. 7, which presents a flow diagram illustrating an example of communication between electronic device 110-1 and access point 112. An interface circuit 710 in electronic device 110-1 may determine a subset 712 of one or more frequency sub-bands for which electronic device 110-1 has a coexistence issue. For example, subset 712 may be determined based at least in part on communication with access point 112 using a communication protocol, and the coexistence issue may be associated with a different communication protocol.

Then, interface circuit 710 may provide a management frame 714 to access point 112 with information that specifies subset 712. For example, management frame 714 may include an information element that specifies subset 712, such as a bitmap that specifies subset 712.

After receiving management frame 714, interface circuit 716 in access point 112 may extract the information that specifies subset 712. Subsequently, interface circuit 716 may avoid using or allocating subset 712 when communicating with electronic device 110-1.

For example, interface 716 may provide a trigger frame 718 to at least electronic device 110-1 that excludes subset 712 of the one or more frequency sub-bands. In response to trigger frame 718, interface circuit 710 may provide an OFDMA frame 720 to access point 112 that has blanks in subset 712 of the one or more frequency sub-bands. Next, interface circuit 710 may receive OFDMA frame 720.

Alternatively or additionally, interface circuit 716 may provide a frame 722 (such as a MIMO frame or an OFDMA frame) to at least electronic device 110-1 that excludes subset 712 of the one or more frequency sub-bands. Then, interface circuit 710 may receive frame 722.

While FIGS. 4 and 7 are illustrated with single-side arrows corresponding to unidirectional communication among components in and between access point 112 and electronic device 110-1, more generally operations during communication among components in and between access point 112 and electronic device 110-1 may involve unidirectional and/or bidirectional communication.

Figure 8:
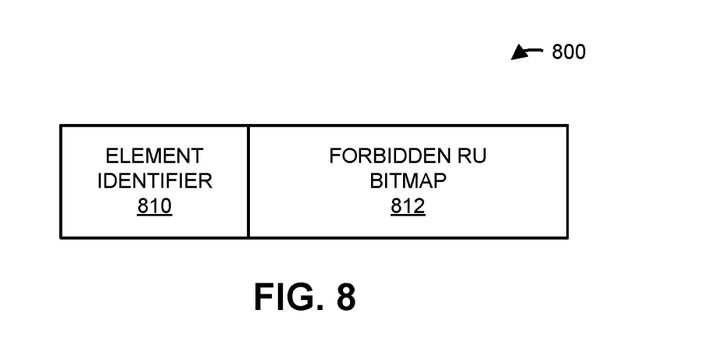
FIG. 8 is a drawing illustrating an example of an information element.

FIG. 8 presents a drawing illustrating an example of an information element 800. This information element may include a field with an element identifier 810 and a field with a forbidden RU bitmap 812.

Note that the formats of packets or frames communicated during the communication techniques may include more or fewer bits and/or fields. Alternatively or additionally, the position of information in these packets or frames may be changed. Thus, the order of the fields may be changed.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 9 presents a block diagram of an electronic device 900 (which may be a cellular telephone, an access point, another electronic device, etc.) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, one or more graphics processing units (GPUs), and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: one or more program modules or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
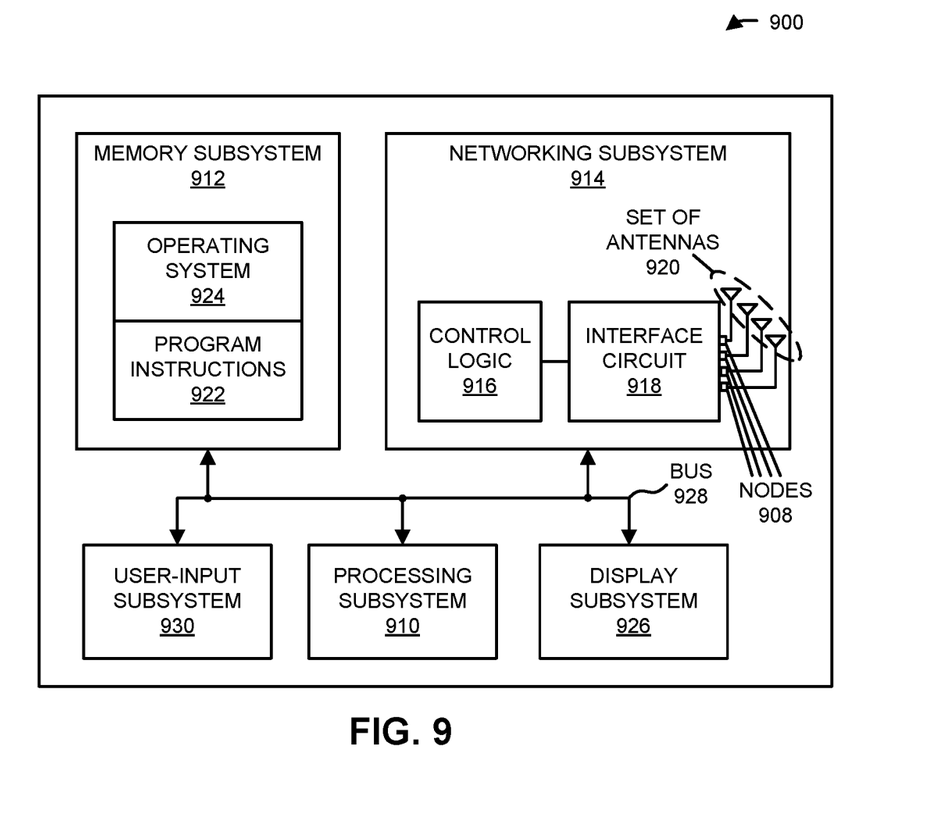
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 914 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918. In some embodiments, the communication techniques is implemented, at least in part, in a MAC layer and/or in a physical layer in interface circuit 918.

Moreover, while the preceding embodiments of the communication techniques were illustrated using UL or DL OFDMA, in some embodiments the communication techniques may be used to indicate forbidden RUs for UL or DL MIMO.

While examples of numerical values are provided in the preceding discussion, in other embodiments different numerical values are used. Consequently, the numerical values provided are not intended to be limiting.

While the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated in the same or a different band of frequencies that the band(s) of frequencies used by the main or primary radio. For example, the communication may use one or more bands of frequencies, including: 900 MHz, 2.4 GHz, 5 GHz, 6 GHz, 60 GHz, a Citizens Broadband Radio Service (CBRS) frequency band, a band of frequencies used by LTE, etc.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots. Moreover, while the preceding embodiments illustrate embodiments of the communication techniques in which there is a coexistence issue with a different communication protocol, in other embodiments the communication techniques may be used when there is a coexistence issue with the same communication protocol that is used during communication between the electronic device and the recipient electronic device (such as when there is interference from a hidden node).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device, wherein the interface circuit is configured to:
provide, to the node, at least a frame, intended for the recipient electronic device, wherein the frame requests a channel status associated with one or more frequency sub-bands; and
receive, at the node, one or more measurement results associated with the recipient electronic device that specify a subset of the one or more frequency sub-bands that are not to be used when communicating with the recipient electronic device.

2. The electronic device of claim 1, wherein at least the frame is associated with a sounding procedure.

3. The electronic device of claim 1, wherein the one or more measurement results are included in a beamforming report.

4. The electronic device of claim 3, wherein the beamforming report comprises a V matrix specifying the subset of the one or more frequency sub-bands.

5. The electronic device of claim 1, wherein the frame comprises a null data packet announcement (NDPA) and a null data packet (NDP).

6. The electronic device of claim 1, wherein the one or more frequency sub-bands comprise one or more resource units (RUs).

7. The electronic device of claim 1, wherein the one or more measurement results comprise one or more instances of a predefined value that specifies the subset of the one or more frequency sub-bands.

8. The electronic device of claim 1, wherein the interface circuit is configured to provide, to the node, a trigger frame intended for at least the recipient electronic device, the trigger frame excluding the subset of the one or more frequency sub-bands.

9. The electronic device of claim 8, wherein the interface circuit is configured to receive, at the node, in response to the trigger frame, an orthogonal frequency division multiple access (OFDMA) frame associated with at least the recipient electronic device, the OFDMA frame having at least one blank in the subset of the one or more frequency sub-bands.

10. The electronic device of claim 1, wherein the interface circuit is configured to provide, to the node, a multiple-input multiple-output (MIMO) frame or an orthogonal frequency division multiple access (OFDMA) frame intended for at least the recipient electronic device, the MIMO frame or the OFDMA frame excluding the subset of the one or more frequency sub-bands.

11. A method for specifying a subset of one or more frequency sub-bands, comprising:
by an electronic device:
sending at least a frame, intended for a recipient electronic device, requesting a channel status associated with the one or more frequency sub-bands; and
receiving one or more measurement results associated with the recipient electronic device that specify the subset of the one or more frequency sub-bands that are not to be used for communication with the recipient electronic device.

12. A recipient electronic device, comprising:
a node configured to communicatively couple to an antenna; and
an interface circuit, communicatively coupled to the node, configured to communicate with an electronic device, wherein the interface circuit is configured to:
receive, at the node, at least a frame associated with the electronic device, wherein the frame requests a channel status for one or more frequency sub-bands; and
provide, to the node, one or more measurement results intended for the electronic device, the one or more measurement results specifying a subset of the one or more frequency sub-bands that are not to be used for communication with the recipient electronic device.

13. The recipient electronic device of claim 12, wherein at least the frame is associated with a sounding procedure.

14. The recipient electronic device of claim 12, wherein the one or more measurement results are included in a beamforming report.

15. The recipient electronic device of claim 12, wherein at least the frame comprises a null data packet announcement (NDPA) and a null data packet (NDP).

16. The recipient electronic device of claim 12, wherein the one or more frequency sub-bands comprise one or more resource units (RUs).

17. The recipient electronic device of claim 12, wherein the one or more measurement results comprise one or more instances of a predefined value that specifies the subset of the one or more frequency sub-bands.

18. The recipient electronic device of claim 12, wherein the interface circuit is configured to:
receive, at the node, a trigger frame associated with the electronic device, the trigger frame excluding the subset of the one or more frequency sub-bands; and
provide, to the node, in response to the trigger frame, an orthogonal frequency division multiple access (OFDMA) frame intended for the electronic device, the OFDMA frame having at least one blank in the subset of the one or more frequency sub-bands.

19. The recipient electronic device of claim 12, wherein the interface circuit is configured to receive, at the node, a multiple-input multiple-output (MIMO) frame or an orthogonal frequency division multiple access (OFDMA) frame associated with the electronic device, the MIMO frame or the OFDMA frame excluding the subset of the one or more frequency sub-bands.

20. The recipient electronic device of claim 12, wherein the interface circuit is configured to receive at least the frame using a first communication protocol and to determine the subset of the one or more frequency sub-bands for which the recipient electronic device has a coexistence issue with a second communication protocol, different from the first communication protocol.

* * * * *